(12) United States Patent  
Shiizaki et al.

(10) Patent No.: US 8,270,989 B2  
(45) Date of Patent: Sep. 18, 2012

(54) BASE STATION, COMMUNICATION TERMINAL, METHOD FOR COMMUNICATION AT BASE STATION, METHOD FOR COMMUNICATION AT COMMUNICATION TERMINAL, AND COMMUNICATION SYSTEM

(75) Inventors: Kotaro Shiizaki, Kawasaki (JP); Takao Nakagawa, Kawasaki (JP); Kazuo Kawabata, Kawasaki (JP); Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 158 days.

(21) Appl. No.: 12/478,168

(22) Filed: Jun. 4, 2009

(65) Prior Publication Data

US 2010/0190505 A1 Jul. 29, 2010

(30) Foreign Application Priority Data

Jul. 28, 2008 (JP) ................. 2008-193772

(51) Int. Cl.
*H04W 72/00* (2009.01)
(52) U.S. Cl. .................. 455/452.1; 455/452.2; 455/561; 455/574
(58) Field of Classification Search ............... 455/575.7, 455/351, 69, 571, 127.1, 573; 607/32, 60, 607/31; 330/51, 297; 713/320; 340/12.5, 340/7.63
See application file for complete search history.

(56) References Cited

U.S. PATENT DOCUMENTS

| | | | | |
|---|---|---|---|---|
| 5,974,327 A * | 10/1999 | Agrawal et al. | ............ | 455/452.2 |
| 6,108,316 A * | 8/2000 | Agrawal et al. | ............... | 370/311 |
| 7,570,968 B2 * | 8/2009 | Huh et al. | ...................... | 455/522 |
| 2001/0005686 A1 * | 6/2001 | Naito et al. | ................... | 455/574 |
| 2002/0132649 A1 * | 9/2002 | Motohashi | .................... | 455/572 |
| 2003/0190938 A1 * | 10/2003 | Ganton | ......................... | 455/574 |
| 2005/0156748 A1 * | 7/2005 | Lee | ............................. | 340/636.1 |
| 2005/0169257 A1 * | 8/2005 | Lahetkangas et al. | ........ | 370/389 |
| 2006/0229014 A1 * | 10/2006 | Harada et al. | ................ | 455/41.2 |
| 2007/0123299 A1 * | 5/2007 | Ragan | ......................... | 455/556.1 |
| 2007/0213101 A1 * | 9/2007 | Oh et al. | ....................... | 455/572 |
| 2007/0252552 A1 * | 11/2007 | Walrath | ........................ | 320/107 |
| 2010/0039316 A1 * | 2/2010 | Gronemeyer et al. | ... | 342/357.06 |

FOREIGN PATENT DOCUMENTS

| | | |
|---|---|---|
| EP | 0 915 632 | 5/1999 |
| JP | 11-196478 | 7/1999 |
| JP | 2007-235558 | 9/2007 |
| WO | 03/098882 | 11/2003 |
| WO | 2008/054113 | 5/2008 |

OTHER PUBLICATIONS

Extended European Search Report and Communication for corresponding European Patent Application No. 09163411.3, dated Dec. 10, 2009.
NTT DoCoMo, Inc; Tdoc-R2-080434; "UE residual battery level reporting"; For: discussion and decision; Agenda Item 4.5; 3GPP TSG RAN WG2 #60bis, Seville, Spain Jan. 14-18, 2008.

* cited by examiner

*Primary Examiner* — Jean Gelin
*Assistant Examiner* — Mahendra Patel
(74) *Attorney, Agent, or Firm* — Fujitsu Patent Center

(57) ABSTRACT

According to priorities determined on the basis of a number of pieces of battery information which concern batteries of a number of communication terminals and each of which is received from the communication terminals, data communication with communication terminals are controlled. The priorities are varied, irrespective of a variation in the pieces of battery information, according to a rule predetermined.

8 Claims, 11 Drawing Sheets

FIG. 2

(1) AT TIME POINT t1

| TERMINAL | AMOUNT OF REMAINING BATTERY (TIME) | PRIORITY |
|---|---|---|
| #1 | 0.8 | 1 |
| #2 | 2.0 | 3 |
| #3 | 3.5 | 5 |
| #4 | 1.2 | 2 |
| #5 | 3.2 | 4 |

AFTER THE PASSAGE OF TIME T (2) AT TIME POINT t1+T

| TERMINAL | AMOUNT OF REMAINING BATTERY (TIME) | PRIORITY |
|---|---|---|
| #1 | 0.5 | 1 |
| #2 | 1.7 | 3 |
| #3 | 3.2 | 5 |
| #4 | 0.9 | 2 |
| #5 | 2.9 | 4 |

FIG. 3

(1) AT TIME POINT t1

| TERMINAL | AMOUNT OF REMAINING BATTERY (TIME) | PRIORITY |
|---|---|---|
| #1 | 0.8 | 1 |
| #2 | 2.0 | 3 |
| #3 | 3.5 | 5 |
| #4 | 1.2 | 2 |
| #5 | 3.2 | 4 |

AFTER THE PASSAGE OF TIME T (2) AT TIME POINT t1+T

| TERMINAL | AMOUNT OF REMAINING BATTERY (TIME) | PRIORITY |
|---|---|---|
| #1 | 0.5 | 5 |
| #2 | 1.7 | 2 |
| #3 | 3.2 | 4 |
| #4 | 0.9 | 1 |
| #5 | 2.9 | 3 |

BASE STATION, COMMUNICATION TERMINAL, METHOD FOR COMMUNICATION AT BASE STATION, METHOD FOR COMMUNICATION AT COMMUNICATION TERMINAL, AND COMMUNICATION SYSTEM

CROSS-REFERENCE TO RELATED APPLICATION

This application is based upon and claims the benefit of priority of the prior Japanese Application No. 2008-193772 filed on Jul. 28, 2008 in Japan, the entire contents of which are hereby incorporated by reference.

FIELD

The embodiment discussed herein is a base station, a communication terminal, a method for communication at a base station, a method for communication at a communication terminal, and a communication system. The present embodiment may be used in a wireless communication system including, for example, abase station and a communication terminal.

BACKGROUND

In wireless communication of abase station with a number of communication terminals, the base station sometimes optimizes allocation of a wireless resource to each communication terminal (scheduling) and/or selects a communication method suitable for each communication terminal with the intention of avoiding reduction in communication efficiency.

In addition, Long Term Evolution (LTE) which is currently being standardized by Radio Access Network (RAN) 2 of 3rd Generation Partnership Project (3GPP) and other techniques have proposed that each communication terminal reports the amount of remaining battery therein.

As one solution, the Patent Reference 1 below considers that communication control is based on, for example, an amount of transmitting and receiving data, Quality of Service (QoS), propagating environment (quality) between a base station and the communication terminal, the number of communication terminals that desire communication with the base station, and an amount of remaining battery of each communication terminal.

[Patent Reference 1] Japanese Laid-open Patent Publication No. 11-196478

However, if a prior technique carries out communication control in which a communication terminal with a lower amount of remaining battery is preferentially treated, a particular communication terminal may be kept being preferentially treated.

SUMMARY (1) According to an aspect of the embodiment, an apparatus includes abase station communicable with a plurality of communication terminals, including: a communication controller that controls data communication with the plurality of communication terminals in accordance with a plurality of priorities determined based on a plurality of battery information pieces about batteries of the plurality of communication terminals each of which battery information pieces is received from one of the plurality of communication terminals; and a priority controller that varies, irrespective of a variation in the plurality of battery information pieces, the plurality of priorities in accordance with a rule predetermined.

(2) According to an aspect of the embodiment, an apparatus includes a communication terminal communicable with a base station, including: an information transmitter that transmits a battery information piece about a battery of the communication terminal, wherein the communication terminal is controlled to communicate with the base station in accordance with a priority determined based on a plurality of the battery information pieces by the base station, the priority being varied, irrespective of a variation in the battery information pieces, in accordance with a rule predetermined.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 2 is example depicting a setting example of a priority table;

FIG. 3 is example depicting a setting example of a priority table;

DESCRIPTION OF EMBODIMENT

Hereinafter, an embodiment will now be described with reference to accompanying drawings. However the embodiment that will be described below is only an example and does not intend to reject application of the various modification and technique about which the embodiment is silent. In other words, the embodiment can be accomplished under the presence of various changes and modifications without departing from the gist of the embodiment.

(1) First Embodiment

Figure 1:
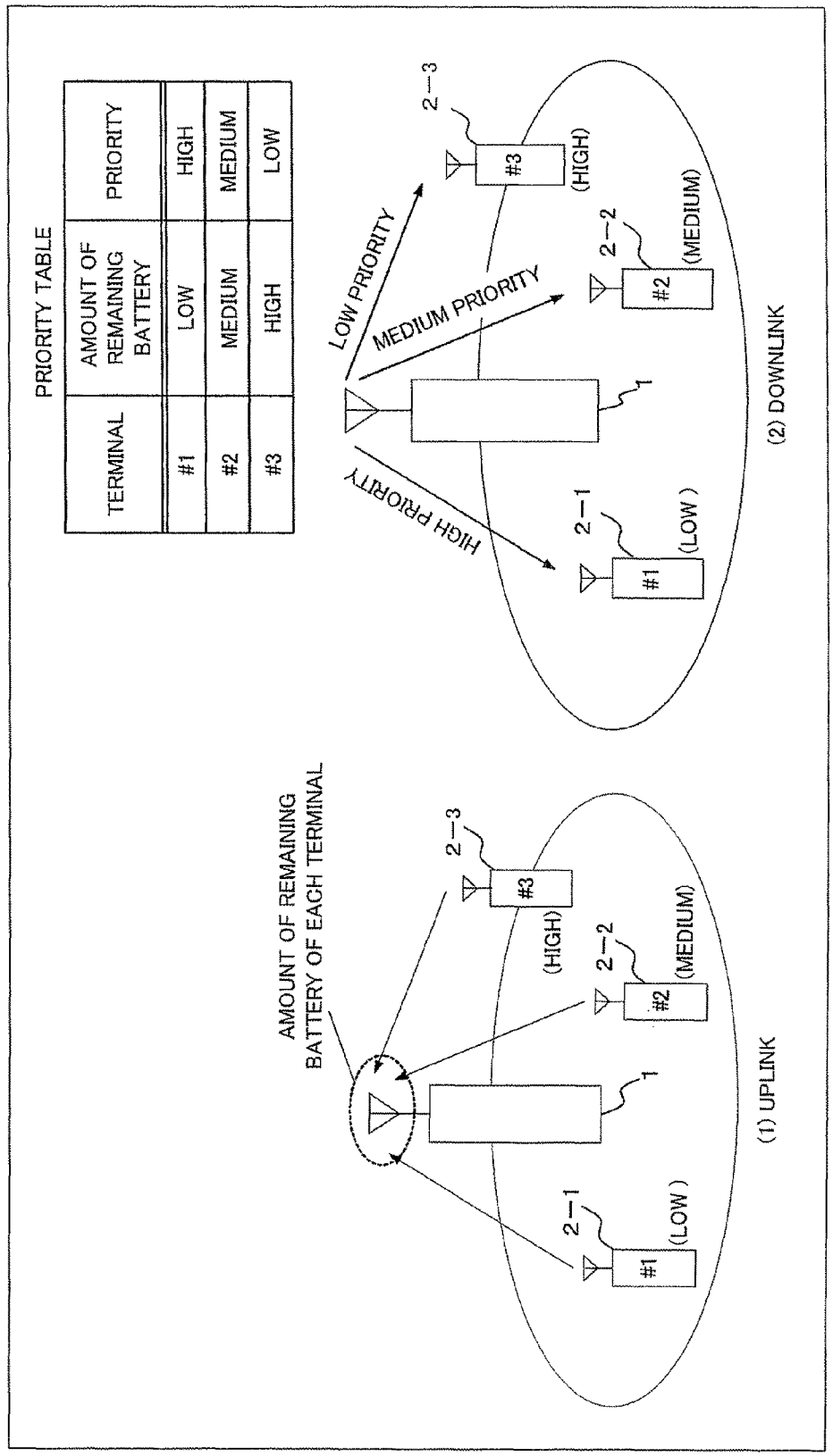
FIG. 1 is a diagram illustrating an example of the configuration of a wireless communication system according to a first embodiment.

The drawings (1) and (2) in FIG. 1 are examples of a wireless communication system according to the first embodiment.

The wireless communication systems illustrated in the drawings (1) and (2) of FIG. 1 are formed of a base station (e.g., e-Node B, eNB) 1 and communication terminals (e.g., pieces of User Equipment, UEs) 2-1, 2-2, and 2-3 that are wirelessly communicable with the eNB 1, for example. Hereinafter, a UE is represented by reference number 2 if the UEs 2-1, 2-2, and 2-3 need not be discriminated from one another. The number of eNBs 1 and the number of UEs 2 are not limited to those in the example of FIG. 1.

Hereinafter, communication from the UEs 2 to the eNB 1 as performed in the drawing (1) of FIG. 1 is called uplink and communication from the eNB 1 to the UEs 2 as performed in the drawing (2) of FIG. 1 is called downlink.

The eNB 1 relays data and calls between an upper-level equipment (not illustrated) and the UEs 2, and controls communication between the upper-level equipment and the UEs 2. The UEs 2 sends and receives data and calls. The data here includes user data and various pieces of controlling information.

A UE 2 receives downlink data from the eNB 1 and notifies the result of the reception process to the eNB 1. For example, if the downlink data is received without an error, the UE 2 returns an ACK (ACKnowledged) that means successful reception to the eNB 1 while if an error occurs during the reception, the UE 2 returns a NACK (Not ACKnowledged) that means failure reception to the eNB1. If receiving an ACK, the eNB 1 transmits another data to the same UE 2; and if receiving a NACK, the eNB 1 retransmits the same data erroneously received to the UE 2. The eNB 1 can notify a UE 1 of a result of reception of uplink data transmitted from the UE 2. For example, according to the result of reception of unlink data from a UE 2, the eNB 1 transmits an ACK or a NACK to the same UE 2, which transmits another data to the eNB 1 if receiving an ACK while transmits the same data erroneously received to the eNB 1 if receiving a NACK.

In addition to normal communication, a UE 2 notifies the eNB 1 of information (hereinafter called battery information) about the amount of remaining battery (e.g., a remaining battery life) thereof at a regular or irregular timing.

In the example of the drawings (1) and (2) of FIG. 1, the amount of battery remaining in the UE 2-1 is less than those of the UEs 2-2 and 2-3, and the amount of battery remaining in the UE 2-2 is less than that of the UE 2-3.

Here, upon receipt of battery information from each UE 2, the eNB 1 manages (monitors) the amount of remaining battery in each UE 2 and determines priorities that is given to the UEs 2 such that communication control for the UE 2-1 with the least amount of remaining battery overrides communication control for the remaining UEs 2-2 and 2-3. The eNB 1 controls the communication with each UE 2 in accordance with the determined priorities (a preferential treatment is given to the UE 2-1). Such communication control, as one example, provides higher communication efficiency to a UE 2 with a higher priority by varying a data rate or by allocation of a communication with a higher communication quality.

For the above, the eNB 1 has a priority table in which an amount of remaining battery in each UE 2 is associated with a priority given to the same UE 2, as depicted in the drawing (2) of FIG. 1. The priority table is updated each time that the eNB 1 receives a battery information piece from each UE 2 at a regular or irregular timing.

In the example depicted in the drawing (2) of FIG. 1, the UE 2-1 with the least amount of remaining battery (the amount of remaining battery is low) is given a high priority (the highest priority) in the priority table. In the same priority table, a medium priority is given to the UE 2-2 having the amount of remaining battery more than that of the UE 2-1 but less than that of the UE 2-3 (the amount of remaining battery is medium); and a low priority (the lowest priority) is given to the UE 2-3 with the largest amount of remaining battery (the amount of remaining battery is high).

In the above manner, the eNB 1 determines priorities given to the UEs 2 on the basis of the battery information pieces received from the UEs 2, and controls data communication with each of the UEs 2 according to the priorities determined. Namely, the eNB 1 carries out communication control that gives a preferential treatment to the UE 2-1 with a higher priority than the remaining UEs 2-2 and 2-3.

Since, during the above communication, the relationship among the amounts of remaining battery in the UEs 2 is not changed unless batteries of one or more of the UEs 2 are charged, the UE 2-1 having a less amount of remaining battery than the remaining UEs 2-2 and 2-3 may keep being preferentially treated.

The drawing (1) of FIG. 2 denotes an example of the priority table registered at a time point $t_1$ ($t_1$ is a positive number). At the time point $t_1$, the eNB 1 receives the amounts of remaining battery (i.e., remaining battery lives) from UE 2-1 (#1) through UE 2-5 (#5) and determines priorities according to the pieces of battery information based on the battery information in the priority table.

The priority table stores, as the amounts of remaining batteries in UE#1 through UE#5 at the time point $t_1$, in sequence 0.8, 2.0, 3.5, 1.2, and 3.2. Further, since a UE 2 with a less amount of remaining battery is given a higher priority, the priorities 1, 3, 5, 2, and 4 are respectively given to the UE#1 through UE#5, for example. Here, a smaller number set for a priority represents a higher priority.

The eNB 1 having such a priority table allocates a communication channel with the highest communication quality to the UE#1 given the highest priority. In the meanwhile, to the remaining UE#2 to UE#5, the eNB 1 allocates a communication channel with a better communication quality to a UE with a higher priority.

Here, a table (2) in FIG. 2 represents an example of the priority table at a time point at which a predetermined time T (T is a positive number) has passed since the time point $t_1$.

As depicted in the example of the table (2) of FIG. 2, the battery in each UE 2 may not be charged until a predetermined time T has passed since the time point $t_1$. In such a case, the amounts of remaining batteries of UE#1 through UE#5 evenly reduce to respectively be, for example, 0.5, 1.7, 3.2, 0.9, and 2.9. However, since a UE 2 with a smaller amount of remaining battery is given a higher priority, the priorities given to UE#1 through #5 remain at in sequence 1, 3, 5, 2, and 4.

Unless the battery of each UE 2 is not charged, the order (i.e., the relationship) of the amounts of remaining batteries does not vary and therefore the priorities that the eNB 1 gives to the UEs 2 do not vary. Consequently, the UE 2-1 is preferentially treated by the eNB 1 in the example depicted in both drawings (1) and (2) of FIG. 2.

Further, since information of an amount of remaining battery is independently possessed by each corresponding UE 2, the eNB 1 cannot judge the validity of an amount of remaining battery notified from each UE 2. Accordingly, the above setting for priorities may keep preferentially treating a UE 2 which notifies a false amount of remaining battery (a smaller amount than an actual amount). Therefore, there is possibility that a UE 2 actually having a low amount of remaining battery suffers from a disadvantage.

As a solution, the first embodiment varies the priorities, which have been determined on the basis of pieces of battery information received from the UEs 2, in accordance with a predetermined rule irrespective of a variation in the pieces of battery information. The rule, for example, lowers the priority of a UE2 given the highest priority for a predetermined time period, or lowers the priority of a UE 2 with the number of times subjected to communication control under the initial priority being a certain number of times or more. Alternatively, the rule lowers the priority of a UE 2 whose amount of reduction in the remaining battery within a predetermined time period is less than a certain value.

A table (1) in FIG. 3 is an example of a priority table registered at a time point $t_1$, similarly to the table (1) of FIG. 2, and a table (2) is an example of a priority table registered at a time point at which a predetermined time T has passed since the time point $t_1$.

As depicted in the table (2) of FIG. 3, the eNB 1 of the first embodiment lowers the priority of the UE#1 given the highest priority "1" to the lowest priority "5" after the passage of a predetermined time (T) from the previous setting of the priorities. The lowering of the priority of the UE#1 may accompany a raise of the priorities of the remaining UE#2 through UE#5, so that the highest priority is given to the UE#4.

Thereby, it is possible to prevent a single UE 2 from keeping being preferentially treated and to maintain the fairness of the communication between each UE 2 and the eNB 1.

The eNB 1 of the first embodiment may modify the priorities of two or more UEs 2, and may vary the degree of lowering in each priority. The eNB 1 may further make the above modification in the priority each time the predetermined time T passes (i.e., at the periodic intervals of time T).

This makes it possible to more flexibly modify the priorities, so that the fairness of communication can be efficiently maintained.

(2) Example of a Wireless Communication System

Hereinafter, description will now be made in relation to an example of the above wireless communication system.

(2.1) UE 2

Figure 6:
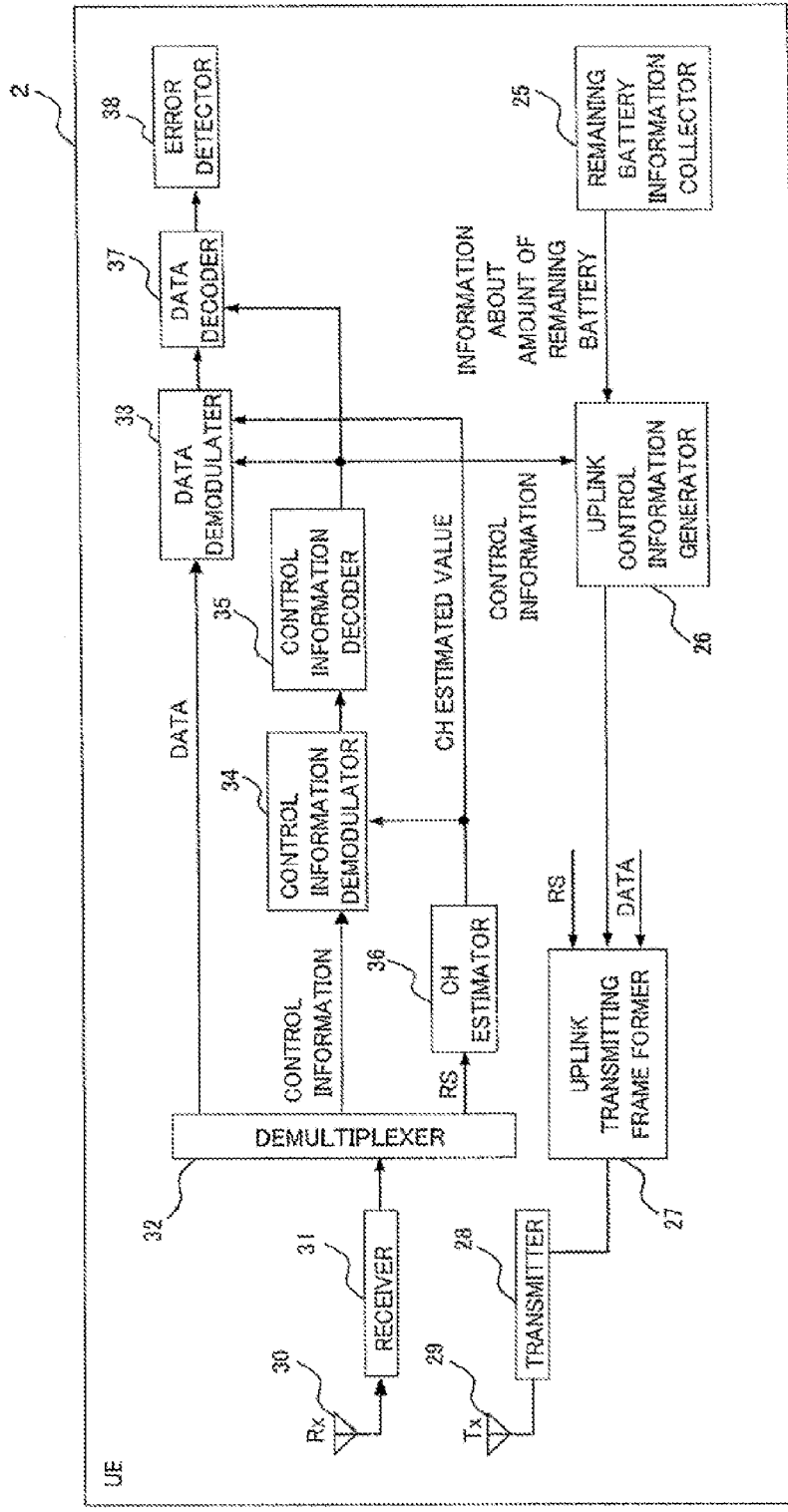
FIG. 6 is a block diagram schematically depicting an example of the configuration of a communication terminal depicted in FIG. 1.

FIG. 6 is a block diagram schematically illustrating an example of the configuration of the UE 2 according to the first embodiment. The UE 2 illustrated in FIG. 6 includes a remaining battery information collector 25, an uplink control information generator 26, an uplink transmitting frame former 27, a transmitter 28, a transmitting antenna 29, a receiving antenna 30, and a receiver 31. Additionally, the UE 2 of this example includes a demultiplexer 32, a data demodulator 33, a controlling information demodulator 34, a controlling information decoder 35, a CH estimator 36, a data decoder 37, and an error detector 38.

Here, the transmitting antenna (Tx) 29 functions as a wireless interface that transmits uplink wireless signals to the eNB 1.

The receiving antenna (Rx) 30 functions as a wireless interface that receives downlink signals from the eNB 1. The functions of these antennas may be realized by a single antenna for transmitting and receiving signals.

The transmitter 28 performs a predetermined wireless transmitting process on uplink data that is to be transmitted to the eNB 1. The wireless transmitting process is exemplified by DA (digital/analog) conversion on transmitting data destined for the eNB 1, frequency conversion (up-conversion) to a wireless frequency, or amplification of electric power.

The receiver 31 performs a predetermined wireless receiving process on a wireless signal received at the receiving antenna 30 from the eNB 1. The wireless receiving process is exemplified by low-noise amplification on received wireless signal, frequency conversion (down-conversion) to a baseband frequency, and AD (analog/digital) conversion.

The demultiplexer 32 separates a received signal, on which the receiver 31 has performed the predetermined wireless receiving process, into each of channels representing controlling information by the eNB 1, and other signals (user data, or an RS signal). User data is signals transmitted via a data channel from the eNB 1 and is sent to the data demodulator 33 after the channel separation in the demultiplexer 32. An RS signal is a signal already known and is sent to the CH estimator 36 after the channel separation in the demultiplexer 32.

The controlling information includes, for example, an ACK/NACK signal, and a Channel Quality Indicator (CQI) representing a reception quality at the eNB 1. The controlling information of the first embodiment additionally includes a result of scheduling at the eNB 1. The controlling information is sent to the controlling information demodulator 34 after the channel separation in the demultiplexer 32.

The CH estimator 36 estimates a channel (CH) using the RS signal received from the eNB 1. The channel estimated value obtained through the channel estimation is sent to the controlling information demodulator 34 and the data demodulator 33.

The controlling information demodulator 34 carries out a predetermined demodulation process with the channel estimated value sent from the CH estimator 36 on the controlling information received from the eNB 1.

The controlling information decoder 35 performs a predetermined decoding process on the controlling information demodulated by the controlling information demodulator 34. The controlling information demodulated and decoded respectively in the controlling information demodulator 34 and the controlling information decoder 35 is sent to the data demodulator 33 and the data decoder 37. The controlling information includes, as described above, the result (uplink resource allocation information) of scheduling at the eNB 1. The uplink resource allocation information is sent to the uplink control information generator 26.

The data demodulator 33 performs a predetermined demodulating process with a channel estimated value notified from the CH estimator 36 and the controlling information notified from the controlling information decoder 35 on a signal of a data channel received from the eNB 1.

The data decoder 37 performs a predetermined decoding process with the controlling information from the controlling information decoder 35 on the signal of the data channel which signal has been demodulated by the data demodulator 33. The signal of the data channel which signal has demodulated and decoded respectively by the data demodulator 33 and the data decoder 37 is sent to the error detector 38.

Through the above procedure, the UE 2 of the first embodiment can be benefit from the communication control based on predetermined priorities that the eNB 1 modifies according to one of the following rules.

The error detector 38 detects whether or not the signal of the data channel received from the eNB 1 has an error by using, for example, an error-detecting code such as a Cyclic Redundancy Check (CRC).

If detecting an error in the signal of the data channel received from the eNB 1, the error detector 38 of the first embodiment transmits a NACK signal representing detection of an error to the eNB 1 to thereby request retransmission of the same signal. On the other hand, if detecting no error in the signal of the data channel received from the eNB 1 (in other words, if the signal is normally received), the error detector 38 transmits an ACK signal representing successful reception to the eNB 1.

The remaining battery information collector 25 measures an amount of remaining battery (not illustrated) possessed by each UE 2. The battery supplies power to the UE 2 and can be a primary battery (a dry battery), a secondary battery (a storage battery), a chemical battery such as a fuel battery or a biochemical fuel cell), a physical cell such as a photovoltaic cell or a thermoelectric battery. The amount (battery information) of remaining battery measured by the remaining battery information collector 25 is notified to the uplink control information generator 26.

The uplink control information generator 26 creates, using the control information notified from the controlling information decoder 35, reporting information (controlling information) including the battery information, ACK/NACK, CQI and others destined for the eNB 1.

The uplink transmitting frame former 27 allocates on the basis of the uplink resource allocation information included in the controlling information, the reporting information, uplink data, and an uplink RS signal to uplink wireless resource (mapping).

The uplink signal created by the uplink transmitting frame former 27 is transmitted to the eNB 1 via the transmitter 28 and the transmitting antenna 29.

More specifically, the remaining battery information collector 25, the uplink control information generator 26, the uplink transmitting frame former 27, the transmitter 28, and the transmitting antenna 29 serve as an information transmitting unit that transmits information about the battery in the UE 2 itself to the eNB 1.

As described above, the UE 2 of the first embodiment sends the eNB 1 the battery information of the same UE 2 and receives data from eNB 1 through a wireless resource allocated by the eNB 1 on the battery information.

Since the UE 2 of the first embodiment includes the battery information in the controlling information destined for the eNB 1, a variation in the apparatus configuration of the eNB 1 and the UE 2 can be minimized.

Figure 10:
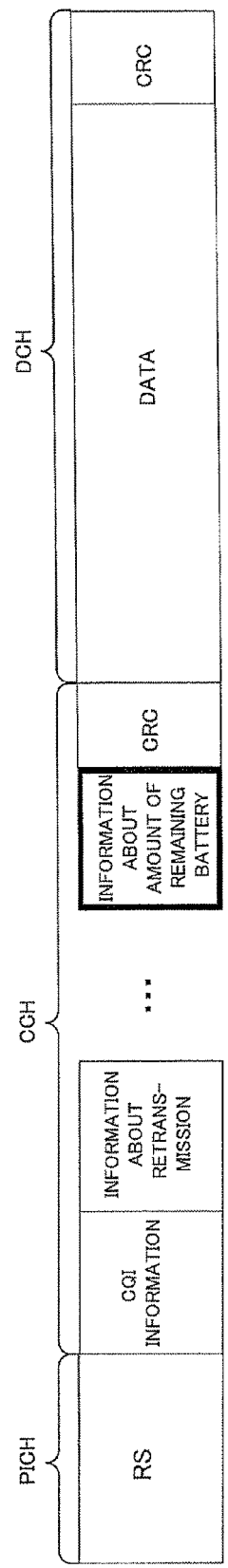
FIG. 10 is a diagram illustrating an example of battery information to be transmitted.

FIG. 10 illustrates an example of the format of a transmitting frame which has battery information included in the controlling information. In FIG. 10, PICH, CCH, and DCH represent the Pilot Channel, the Control Channel, and the Data channel, respectively.

As illustrated in the example of FIG. 10, the UE 2 of the first embodiment adds a new item (field) of information about an amount of remaining battery to the control channel of a transmitting frame, so that the battery information (the information about an amount of remaining battery) in the form of being included in the control channel is sent to the eNB 1.

Figure 11:
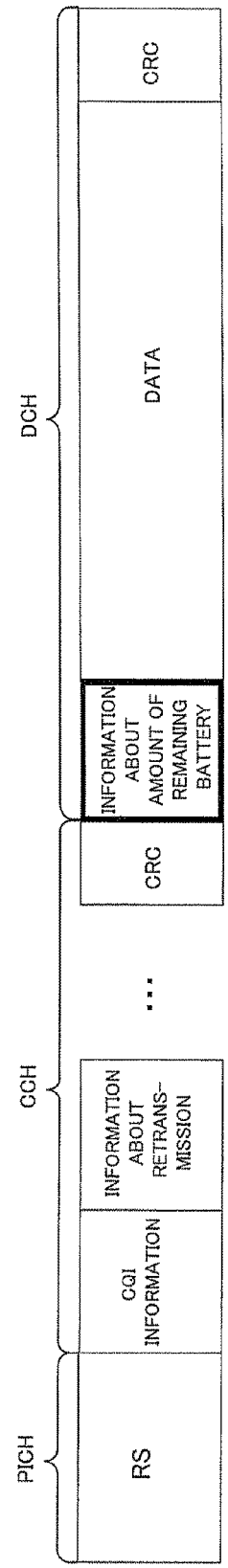
FIG. 11 is a diagram illustrating an example of battery information to be transmitted.

However, as denoted in another example of FIG. 11, the UE 2 may add a new item of the battery information to, for example, the data channel of a transmitting frame, so that the battery information about the battery in the form of being included in the data channel can be sent to the eNB 1. The position of the information about the battery can be commonly known to both the eNB 1 and the UE 2 (for example, three bits starting from the MSB of the data channel).

As described above, since the UE 2 of the first embodiment reports battery information thereof to the eNB 1, the eNB 1 schedules wireless resources considering the battery information from each UE 2.

For example, eNB 1 can allocate a communication channel with a fine communication quality to a UE 2 with low amount of remaining battery.

(2.2) eNB1

Figure 4:
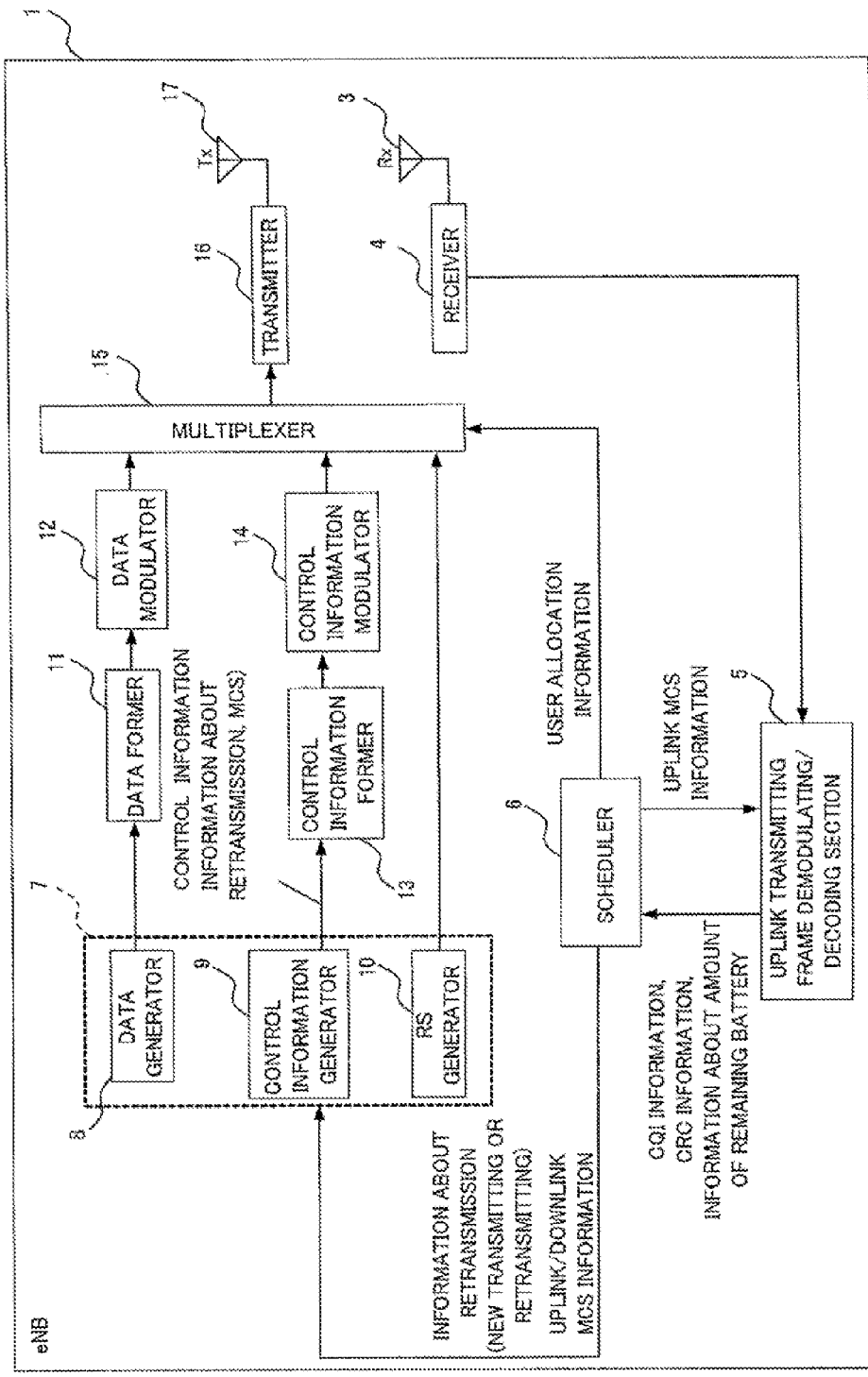
FIG. 4 is a block diagram schematically depicting an example of the configuration of a base station depicted in FIG. 1.

FIG. 4 is a block diagram illustrating an example of the configuration of the eNB 1 of the first embodiment. As illustrated in the example of FIG. 4, the eNB 1 includes a receiving antenna 3, a receiver 4, an uplink transmitting frame demodulating/decoding section 5, and a scheduler 6. The eNB 1 of the first embodiment further includes a generator 7, a data former 11, a data modulator 12, a controlling information former 13, a controlling information modulator 14, a multiplexer 15, a transmitter 16, and transmitting antenna 17.

Here, the receiving antenna (Rx) 3 functions as a wireless interface that receives uplink wireless signals transmitted from a UE 2.

The transmitting antenna (Tx) 17 functions as a wireless interface that transmits downlink wireless signals to a UE 2. The functions of these antennas may be realized by a single antenna for transmitting and receiving signals.

The receiver 4 performs a predetermined wireless transmitting process on a wireless signal that the receiving antenna 3 receives from an UE 2. The wireless transmitting process is exemplified by low-noise amplification on received wireless signal, frequency conversion (down-conversion) to a baseband frequency, and AD (analog/digital) conversion.

The transmitter 16 performs a predetermined wireless transmitting process on downlink data to be transmitted to a UE 2. The wireless transmitting process is exemplified by DA (digital/analog) conversion on transmitting data destined for a UE 2, frequency conversion (up-conversion) to a wireless frequency, or amplification of electric power.

The uplink transmitting frame demodulating/decoding section 5 performs a demodulating and decoding process based on, for example, Modulation and channel Coding Scheme (MCS) information notified by the scheduler 6 on uplink data having been subjected to a predetermined wireless receiving process in the receiver 4.

Uplink data having subjected to a demodulating and decoding process by the uplink transmitting frame demodulating/decoding part 5 includes, for example, information about a CRC (e.g., an ACK/NACK signal) performed at the UE 2 and controlling information such as CQI representing the receiving quality of downlink signal at the UE 2. In addition, the uplink data of the first embodiment includes numerical value information (also called information about an amount of remaining battery or battery information) representing an amount of remaining battery of a corresponding UE 2. As described above, if battery information is included at a known position in the control channel or the data channel of an uplink transmitting frame at the UE 2, the uplink transmitting frame demodulating/decoding section 5 extracts the battery information from the known position.

The scheduler (communication controller) 6 determines, on the basis of pieces of battery information of the UEs 2, priorities one for each of the UEs 2, and allocates a wireless resource to be used for transmission of downlink data to data communication with each UE 2 according to the determined priorities (scheduling). The scheduler 6 of the first embodiment varies the priorities according to one of the rules described above.

The result of scheduling can be notified by means of a downlink signal to each UE 2 in advance. The receipt of the notification makes each UE 2 possible to carry out a proper receiving process on downlink data. For the notification, the downlink control channel can be used, as one example. In this case, the result of scheduling serves as a part of user allocation information and is to be notified to the multiplexer 15.

On the basis of the CRC information (e.g., an ACK/NACK signal) notified by the uplink transmitting frame demodulating/decoding part 5, the scheduler 6 can also transmit new data or retransmit the same data to the UE 2. Alternatively, the scheduler 6 adaptively can select, on the basis of the CQI notified from the uplink transmitting frame demodulating/decoding section 5, an MCS (a coding rate, a modulating scheme) for transmitting data destined for the UE 2. Further, the selected MCS can be varied in accordance with the priorities. The information about new transmission, retransmission and the MCS are notified to the generator 7.

Figure 5:
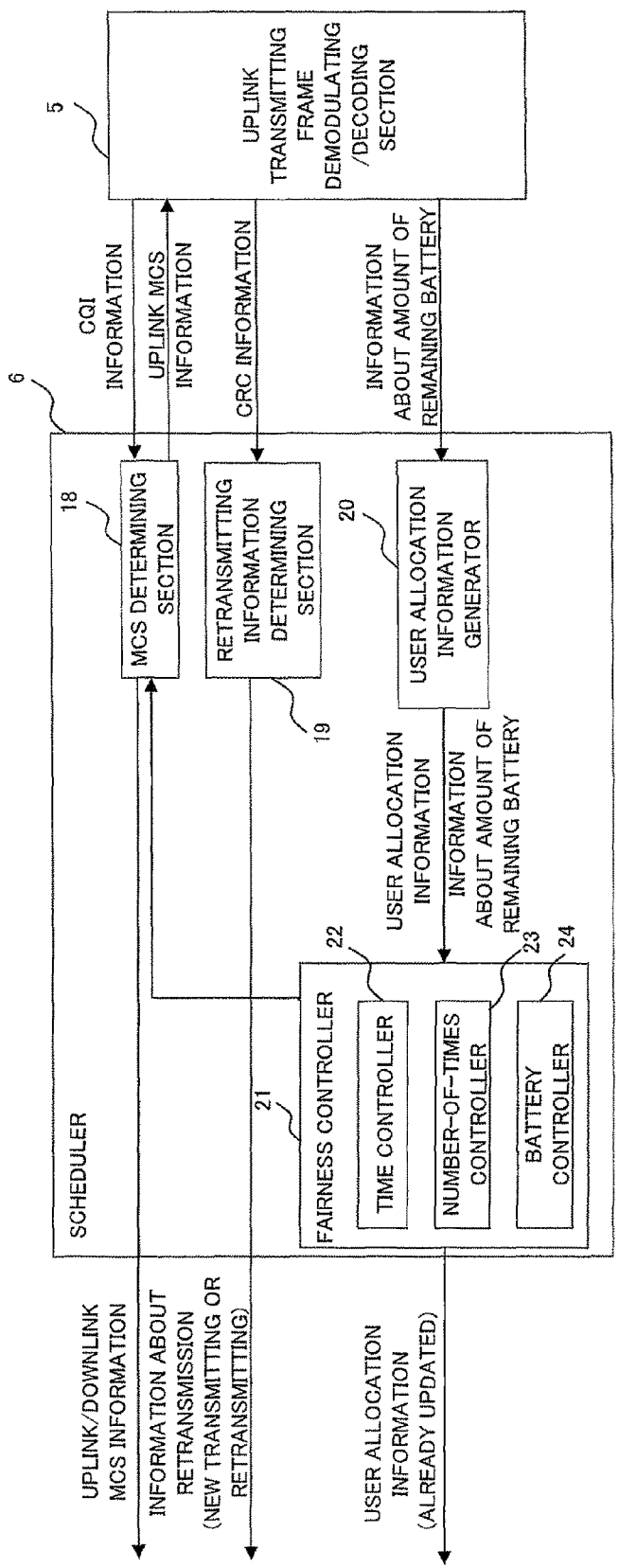
FIG. 5 is a block diagram schematically illustrating a part of the configuration depicted in FIG. 4.

Here, description will now be made in relation to the function of the scheduler 6 of the first embodiment with reference to FIG. 5. As illustrated in FIG. 5, the scheduler 6 of the first embodiment includes an MCS determining section 18, a retransmitting information determining section 19, a user allocation information generator 20, and a fairness controller 21.

The MCS determining part 18 determines MCS information that is to be used for transmission of uplink data by a UE 2. Determined MCS information is notified to the uplink transmitting frame demodulating/decoding section 5 to be used for demodulating and decoding process on uplink data. If adaptive modulation and coding is to be carried out, MCS information for the UE 2 in question is determined on the basis of pieces of CQI information from the UEs 2. In addition, on the basis of downlink CQI information included in uplink control information from the UE 2, the MCS determining section 18 determines downlink MCS information that is to be used to modulate and encode downlink data. Uplink and downlink MCS information is notified to the generator 7.

The retransmitting information determining section 19 determines, on the basis of the CRC information (the result of a CRC) on the downlink data, whether or not a request for new transmission or retransmission of the same data should be issued to the same UE 2. The result of the determination is notified to the generator 7.

The user allocation information generator 20 determines, on the basis of battery information reported from each UE 2, priorities given one to each of the UEs 2. The determined priorities are stored in, for example, a priority table (see FIGS. 2 and 3) possessed by the user allocation information generator 20 in association with the UEs 2. The priority data may be updated each time information about an amount of remaining battery is notified. The contents of such an updated priority table and the information about an amount of remaining battery is included in user allocation information and is sent to the fairness controller 21.

The fairness controller (priority controlling section) 21 varies, on the basis of the contents of the priority table and information about amounts of remaining batteries, the priorities of the UEs 2 according to at least one of the rules so as to avoid unbalanced treatment that a particular UE 2 is preferentially treated. For example, the fairness controller 21 of the first embodiment can lower the highest priority that has been set in the priority table. For this purpose, the fairness controller 21 includes a time controller 22, a number-of-times controller 23, and a battery controller 24, for example. Alternatively, the fairness controller 21 may include, for example, one or two of the time controller 22, the number-of-times controller 23, and the battery controller 24.

The time controller 22 varies, after passage of a predetermined time T since the previous setting of the priorities, the priorities given to the UEs 2 and set in the priority table. For this purpose, the time controller 22 of the first embodiment has a timer (not illustrated) for measuring time. The time controller 22 of the first embodiment lowers the priorities of one or more of the UEs 2 to which a priority of a first threshold value R (R is a positive number) or more has been given in the priority table if the time controller 22 judges that a predetermined time T has passed since the previous setting of the priorities.

The number-of-times controller 23 lowers the priorities of one or more of the UEs 2 each for which the number of times that the priority set in the priority table has updated is a second threshold value Q (Q is a positive number) or more. For this purpose, the number-of-times controller 23 of the first embodiment has a counter (not illustrated) that counts the number of times of updating a priority. The number-of-times controller 23 of the first embodiment lowers, for example, the priority of a UE 2 when the number of times that the UE 2 has transmitted data under control according to the same priorities set in the priority table is the second threshold value Q or more. Alternatively for example, the number-of-times controller 23 may lower the priority of a UE 2 whose the number of times that the priority of the UE 2 has been updated is the second threshold value Q or more.

Further, the battery controller 24 lowers priorities of one or more of the UEs 2 whose variation in the amount of remaining battery (i.e., an amount of reduction in battery) based on the battery information from the UE 2 is less than a third threshold value P (P is a positive number). For example, the battery controller 24 of the first embodiment monitors an amount of remaining battery varying (reducing) within a predetermined time T. If the degree of a variation (reduction) of a UE 2 is less than the third threshold value P, the battery controller 24 judges that the UE 2 reports the amount of remaining battery less than the actual amount and consequently lowers the priority of the UE 2 in question.

Here, the fairness controller 21 (the time controller 22, the number-of-times controller 23, and the battery controller 24) may lower a priority within a constant lowering range (lowering width). This can simplify control for lowering priorities by the fairness controller 21. The above lowering range may be adaptively modified by a system administrator or the like. For example, if the time controller 22 and the number-of-times controller 23 lower a priority, the lowering range may be set such that the priority is lowered to be equal to or lower than the average of the priorities of all the UE2 being in communication with the eNB 1. If the battery controller 24 lowers a priority, the lowering range may be set such that the priority comes to be the lowest.

Further, the fairness controller 21 (the time controller 22, the number-of-times controller 23, and the battery controller 24) may raise, in accompany with the above lowing of the priority, a priority of a UE 2 whose priority has been set to be less than the first threshold value R, for example. As one example, in accordance with lowering the priority of a UE 2 which has kept to be preferentially treated for the predetermined time T, the priorities of the remaining UEs 2 which have not been preferentially treated may be raised (advanced).

That makes it possible to avoid unbalanced setting of priorities given one to each UE 2 so that communication of each UE 2 with the eNB 1 can be treated fair.

If the amount of remaining battery in a UE 2 is regained, the scheduler 6 may lower the priority of the regained UE 2 and at the same time may raise the priority of the remaining UEs 2. Thereby, communication of a UE 2 with an inadequate amount of remaining battery can be preferentially controlled.

The amount of remaining battery in the UE 2 is regained by charging the battery and other manners.

The generator 7 creates various signals based on information about retransmission (information indicating new transmission or retransmission) and MCS information both of which are notified from the scheduler 6. For example, the information about retransmission indicates new transmission, the generator 7 creates new data to be transmitted to a UE 2. Conversely, if the information about retransmission indicates retransmission, the generator 7 generates data to be retransmitted to the UE 2. For this purpose, the generator 7 includes, for example, a data generator 8, a controlling information generator 9, and the RS generator 10 as illustrated in FIG. 4.

The data generator 8 creates downlink data (user data) destined for a UE 2. As described above, the data generator 8 of the first embodiment creates the new data or the retransmitting data as the downlink data, which is sent to the data former 11.

The controlling information generator 9 creates controlling information based on the information about retransmission and the MCS information notified from the scheduler 6. The controlling information can include information about retransmission indicating that the downlink data is for new transmission or for retransmission and MCS information. The controlling information can also include uplink control information to be used for requesting a UE 2 for new transmission or retransmission.

The RS generator 10 generates a Reference Signal (RS) that is already known. An RS is, for example, used for channel estimation in a UE 2 or other purposes.

The data former 11 performs, on the basis of information about a coding rate included in the MCS information notified from the scheduler 6, a predetermined coding on the downlink data destined for a UE 2 and generates data having a predetermined format (rate) that is to be transmitted.

The data modulator 12 performs, on the basis of information about a modulation method included in the MCS information notified from the scheduler 6, a predetermined modulating process on the downlink data destined for a UE 2. To the modulated downlink data destined for a UE 2, a CRC code may be attached.

The controlling information former 13 creates, on the basis of information about a coding rate included in the MCS information notified from the scheduler 6, a predetermined coding on the controlling information created by the controlling information generator 9, and thereby creates controlling information having a predetermined format (rate).

The controlling information modulator 14 performs, on the basis of information about the modulation method included in the MCS information notified from the scheduler 6, a modulating process on the controlling information generated by the controlling information generator 9. To the modulated controlling information, a CRC code may be attached.

Here, the coding processes performed in the data former 11 and the controlling information former 13 can be exemplified by a channel coding process with an error correction code such as a turbo code or a convolutional code. The modulating processes performed in the data modulator 12 and the controlling information modulator 14 can be exemplified by a modulating method of Quadrature Phase Shift Keying (QPSK) or 16 Quadrature Amplitude Modulation (16QAM).

The multiplexer 15 multiplexes, on the basis of the user allocation information from the scheduler 6, the downlink data, the controlling information and the RS, and allocates the multiplexed information to a downlink wireless resource (mapping). The method of the multiplexing can be exemplified by Frequency Division Multiplex (FDM), Time Division Multiplex (TDM), or Orthogonal Frequency-Division Multiplexing (OFDM).

A downlink signal generated by the multiplexer 15 is wirelessly transmitted to a corresponding UE 2 through the transmitter 16 and the transmitting antenna 17.

As described above, since the eNB 1 of the first embodiment modifies, irrespective of the priority determined on the basis of the battery information received from a number of UEs 2, the priorities according to one or more of the predetermined rules, it is possible to prevent the priorities for the UEs 2 from being set unbalanced. Therefore, fairness in communication of each UE 2 with the eNB 1 can be maintained.

(2.2) An Example of an Operation in eNB1

Next, description will now be made in relation to examples of an operation (a communication method) performed by the eNB 1 with reference to FIGS. 7-9.

Figure 7:
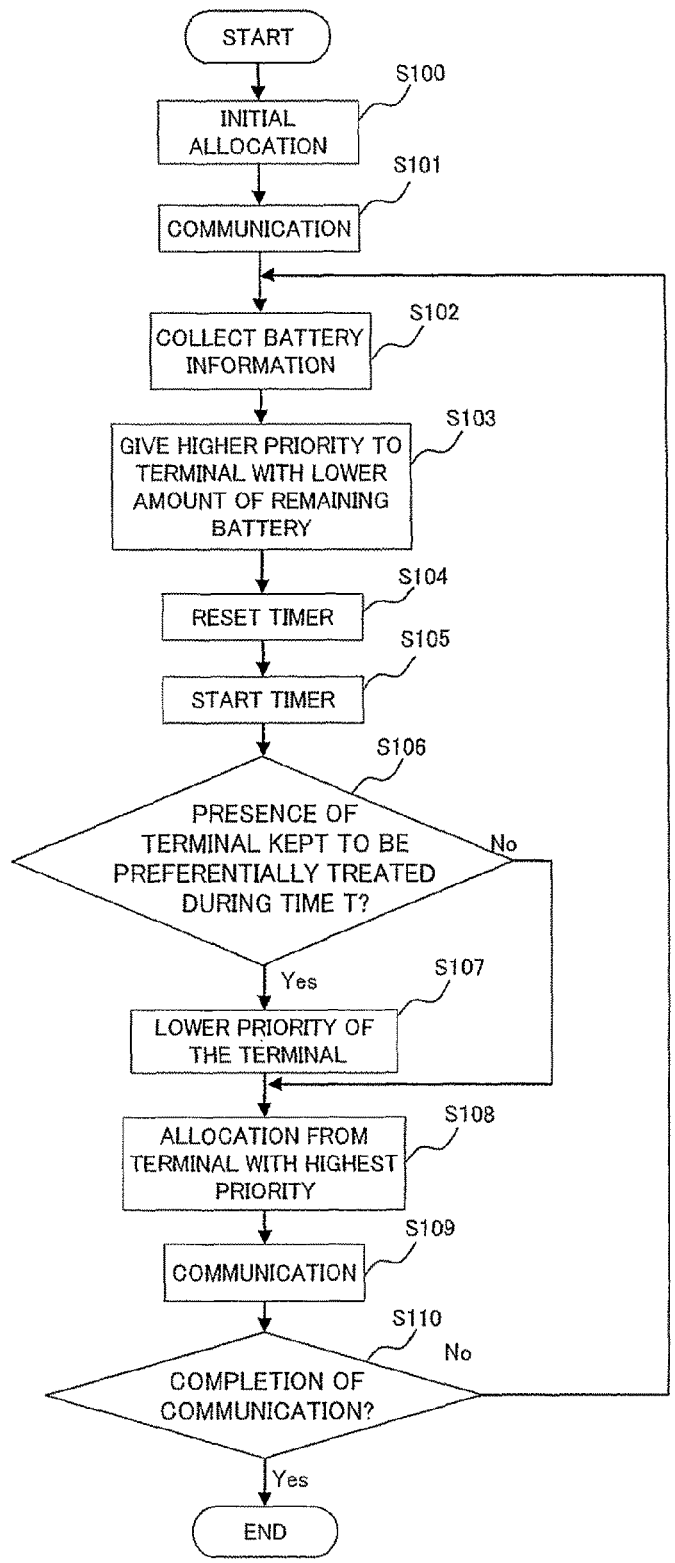
FIG. 7 is a flow diagram depicting an example of a succession of procedural steps performed in the base station illustrated in FIG. 4.

(2.2.1) Control by The time Controller 22 to Modify Priorities:

First, as denoting in FIG. 7, when the eNB 1 starts data scheduling for each of the UEs 2, the eNB 1 carry out initial allocation (initial scheduling) (step S100). In the initial scheduling, the eNB 1 does not yet collect battery information from each UE 2 so that scheduling is carried out evenly. Alternatively, initial priorities may be set when the initial setting is carried out.

On the basis of the result of the scheduling, the eNB 1 transmits downlink data to a UE 2 and receives uplink data from a UE 2, so that the eNB 1 carries out wireless communication with the UEs 2 (step S101).

When the eNB 1 starts communication based on the initial allocation as the above, the eNB 1 receives (collects) pieces of the battery information (an amount of remaining battery) from UEs 2 at a regular or irregular timing (step S102).

With reference to the pieces of the battery information, the eNB 1 sets a higher priority for a UE 2 with a lower amount of remaining battery (step S103). The priority set here is stored (set) in association with each corresponding UE 2 in the priority table by the scheduler 6.

Upon creation of the priority table in the eNB 1, the time controller 22 resets (initializes) the timer (step S104) and starts counting the monitoring time (step S105).

On the basis of the result of counting by the timer, the time controller 22 judges whether or not there is a UE 2 that has kept to have a priority equal to or larger than the first threshold value R during a predetermined time T (monitoring time) (step S106).

If the result of the judgment is positive (Yes route in step S106), the eNB 1 lowers the priority given to the UE 2 that is judged to have held a priority equal to or larger than the first threshold value R or more during the monitoring time (step S107). The lowering range can be a constant width as described above, but may be alternatively modified by the system administrator or the like so that a priority to be lowered comes to be equal to or lower than the average of the priorities of UEs 2 being communication with the eNB 1. Further alternatively, the lowering range may be set so that the priority to be lowered comes to be the lowest.

In accordance with control to lowering of a priority in step S107, the scheduler 6 may raise the priorities of the remaining UEs 2.

Then the eNB 1 controls communication based on the priorities set in the priority table such that a UE 2 with a higher priority is more preferentially treated. For example, a communication channel with a finer communication quality is allocated to a UE 2 with a higher priority (step S108).

On the basis of the result of the allocation in step S108, the eNB 1 schedules data to be received and transmitted with the UEs 2 and makes wireless communication with the UEs 2 (step S109).

Conversely, if the result of the judgment in step S106 is negative (No route in step S106), the eNB 1 does not modify the priorities set in the priority table, and controls communication based on the priorities set in the priority table such that a UE 2 with a higher priority is more preferentially treated (step S108). In succession, on the basis of the result of the allocation in step S108, the eNB 1 schedules data to be received and transmitted with each UE 2 and makes wireless communication with the UE 2 (step S109).

Then the eNB 1 judges whether or not data transmission destined for each UE 2 has been completed (step S110).

If the result of the judgment in step S110 is positive (Yes route in step S110), the eNB 1 terminates the procedure while, the result of the judgment in step S110 is negative (No route in step S110), the eNB 1 repeats the procedure of steps S102 to S110.

Figure 8:
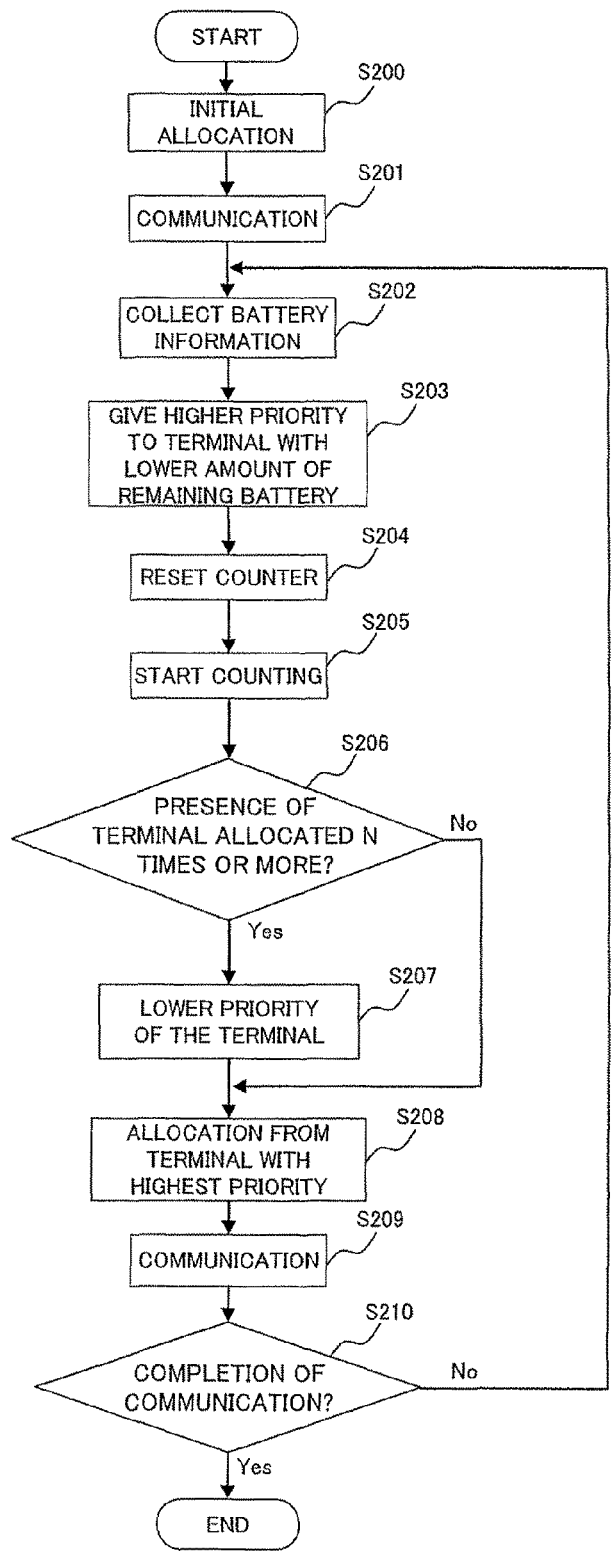
FIG. 8 is a flow diagram depicting an example of a succession of procedural steps performed in the base station illustrated in FIG. 4.

(2.2.2) Control by the Number-of-times Controller 23 to Modify Priorities:

As illustrated in the example of FIG. 8, the number-of-times controller 23 may lower a priority of a UE 2 when the number of times that the priority set for the UE 2 in the priority table has been updated is equal to or larger than the second threshold value Q.

Also in this case, when the eNB 1 starts data scheduling for each of the UEs 2, the eNB 1 carry out initial allocation (initial scheduling) (step S200). In the initial scheduling, the eNB 1 does not yet collect battery information from each UE 2 so that scheduling is carried out evenly. Alternatively, initial priorities may be set when the initial setting is carried out.

On the basis of the result of the scheduling, the eNB 1 transmits downlink data to a UE 2 and receives uplink data from a UE 2, so that the eNB 1 carries out wireless communication with the UEs 2 (step S201).

When the eNB 1 starts communication based on the initial allocation as the above, the eNB 1 receives (collects) pieces of the battery information (an amount of remaining battery) from UEs 2 at a regular or irregular timing (step S202).

With reference to the battery information, the eNB 1 sets a higher priority for a UE 2 with a lower amount of remaining battery (step S203). The priority set here is stored (set) in association with each corresponding UE 2 in the priority table by the scheduler 6.

Upon creation of the priority table in the eNB 1, the number-of-times controller 23 resets (initializes) the counter (step S204) and starts counting the number of times that the priority table has been updated (step S205).

On the basis of the result of the counting with the counter, the number-of-times controller 23 judges whether or not there is a UE 2 whose the number of times that a priority in the priority table has been updated (the number of times that the UE 2 has been allocated according to the priority) is equal to or larger than the second threshold (step S206).

If the result of the judgment is positive (Yes route in step S206), the eNB 1 lowers the priority of the UE 2 with the number of times that the priority table has been updated (the number of times that allocation according to the priority set in the priority table has been made) being equal to or larger than the second threshold value Q (step S207). The lowering range can be a constant width as described above, but may be alternatively modified by the system administrator or the like so that a priority to be lowered comes to be equal to or lower than the average of the priorities of UEs 2 being communication with the eNB 1. Further alternatively, the lowering range may be set so that the priority to be lowered comes to be the lowest.

In accordance with control to lowering of a priority in step S207, the scheduler 6 may raise the priorities of the remaining UEs 2.

Then the eNB 1 controls communication based on the priorities set in the priority table such that a UE 2 with a higher priority is more preferentially treated. For example, a communication channel with a finer communication quality is allocated to a UE 2 with a higher priority (step S208).

On the basis of the result of the allocation in step S208, the eNB 1 schedules data to be received and transmitted with the UEs 2 and makes wireless communication with the UEs 2 (step S209).

Conversely, if the result of the judgment in step S206 is negative (No route in step S206), the eNB 1 does not modify the priorities set in the priority table, and controls communication based on the priorities set in the priority table such that a UE 2 with a higher priority is more preferentially treated (step S208). In succession, on the basis of the result of the allocation in step S208, the eNB 1 schedules data to be received and transmitted with each UE 2 and makes wireless communication with the UE 2 (step S209).

Then the eNB 1 judges whether or not data transmission destined for each UE 2 has been completed (step S210).

If the result of the judgment in step S210 is positive (Yes route in step S210), the eNB 1 terminates the procedure while, the result of the judgment in step S210 is negative (No route in step S210), the eNB 1 repeats the procedure of steps S202 to S210.

Figure 9:
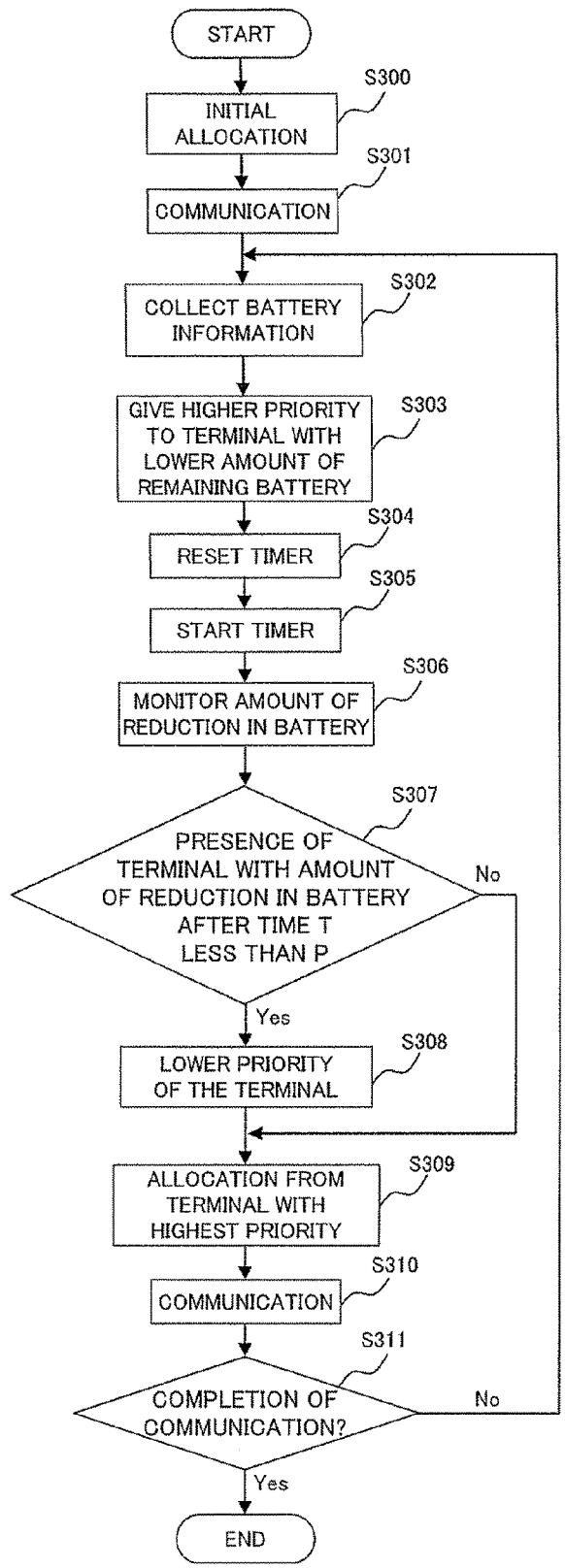
FIG. 9 is a flow diagram depicting an example of a succession of procedural steps performed in the base station illustrated in FIG. 4.

(2.2.3) Control by the Battery Controller 24 to Modify Priorities:

As illustrated in FIG. 9, the battery controller 24 may lower the priority of a UE 2 that has reported a degree of a variation (a reduction) in amount of remaining battery thereof less than the third threshold value P.

Also in this case, when the eNB 1 starts data scheduling for each of the UEs 2, the eNB 1 carry out initial allocation (initial scheduling) (step S300). In the initial scheduling, the eNB 1 does not yet collect battery information from each UE 2 so that scheduling is carried out evenly. Alternatively, initial priorities may be set when the initial setting is carried out.

On the basis of the result of the scheduling, the eNB 1 transmits downlink data to a UE 2 and receives uplink data from a UE 2, so that the eNB 1 carries out wireless communication with the UEs 2 (step S301).

When the eNB 1 starts communication based on the initial allocation as the above, the eNB 1 receives (collects) pieces of the battery information (an amount of remaining battery) from UEs 2 at a regular or irregular timing (step S302).

With reference to the pieces of battery information, the eNB 1 sets a higher priority for a UE 2 with a lower amount of remaining battery (step S303). The priority set here is stored (set) in association with each corresponding UE 2 in the priority table by the scheduler 6.

Upon creation of the priority table, the battery controller 24 resets (initializes) the timer dedicated thereto or shared with the time controller 22 (step S304) and starts counting the monitoring time (step S305).

The battery controller 24 monitors the degree of a variation (reduction) in amount of remaining battery during the monitoring time based on a battery remaining amount report that each UE 2 reports at regular or irregular timing (step S306).

Next, the battery controller 24 judges whether or not there is a UE 2 whose degree of a variation (reduction) in amount of remaining battery within the monitoring time is less than the third threshold value P (step S307).

If the result of the judgment is positive (Yes route in step S307), the eNB 1 lowers the priority of the UE 2 whose degree of a variation (reduction) in amount of remaining battery is less than the third threshold value P (step S308). The lowering range can be a constant width as described above, but may be alternatively modified by the system administrator or the like so that a priority to be equal to or lower than lowered comes to be the average of the priorities of UEs 2 being communication with the eNB 1. Further alternatively, the lowering range may be set so that the priority to be lowered comes to be the lowest.

In accordance with control to lowering of a priority in step S308, the scheduler 6 may raise the priorities of the remaining UEs 2.

Then the eNB 1 controls communication based on the priorities set in the priority table such that a UE 2 with a higher priority is more preferentially treated. For example, a communication channel with a finer communication quality is allocated to a UE 2 with a higher priority (step S309).

On the basis of the result of the allocation in step S309, the eNB 1 schedules data to be received and transmitted with the UEs 2 and makes wireless communication with the UEs 2 (step S310).

Conversely, if the result of the judgment in step S306 is negative (No route in step S306), the eNB 1 does not modify the priorities set in the priority table, and controls communication based on the priorities set in the priority table such that a UE 2 with a higher priority is more preferentially treated (step S309). In succession, on the basis of the result of the allocation in step S309, the eNB 1 schedules data to be received and transmitted with UEs 2 and makes wireless communication with the UEs 2 (step S310).

Then the eNB 1 judges whether or not data transmission destined for each UE 2 has been completed (step S311).

If the result of the judgment in step S311 is positive (Yes route in step S311), the eNB 1 terminates the procedure while, the result of the judgment in step S311 is negative (No route in step S311), the eNB 1 repeats the procedure of steps S302 to S311.

As described above, the method for controlling communication of the first embodiment can modify, on the on the basis of the degree of a reduction in the amount of remaining battery in each UE 2 within a predetermined time, the priorities having determined according to the amounts of remaining battery in the UEs 2, so that fairness of communication of each UE 2 with the eNB 1 can be maintained.

Even if the user unscrupulously holds the amount of remaining battery to be less than a predetermined threshold, the first embodiment can inhibit the remaining UE2 from being affected by such an unscrupulous notification.

(3) Others

According to a requirement, some of the elements and the processes of the eNB 1 and each UE 2 may be dispensable and various combination of the elements and the processes may be suggested.

In the foregoing first embodiment, the above communication control is realized by the eNB 1 and the UEs 2. Alternatively, the communication control may be realized by another entity included in the wireless communication system. For example, the elements and the process of the eNB 1 and the UEs 2 may be disposed and carried out at various position in the communication system, or may be disposed or carried out at a single apparatus (such as an eNB, a UE, and a wireless base station controller).

Further, in the first embodiment, each UE 2 reports battery information, which is included in a control channel or a data channel, to the eNB 1, but the battery information may alternatively be included in one of a number of regions in another transmitting frame format. For example, the battery information may be stored in a message part, which is included in combination with a preamble part of a Random Access Channel (RACH) that is to be used for initiation of communication with the eNB 1.

Further, the first embodiment applies scheduling to the downlink communication, but alternatively the scheduling may also be applied to uplink communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. A base station communicable with a plurality of communication terminals, the base station comprising:
a communication controller that receives information about the amount of remaining battery of the communication terminal from each of the communication terminals, determines a plurality of priorities so that the plurality of priorities get higher as the amount of remaining battery of the transmitter gets lower, and controls data communication with the plurality of communication terminals in accordance with the priorities; and
a priority controller that varies, irrespective of a variation in the plurality of the information, the plurality of priorities so that the plurality of priorities are leveled off in a predetermined time period.

2. The base station according to claim 1, wherein the priority controller lowers the highest priority among the plurality of priorities.

3. The base station according to claim 1, wherein the priority controller lowers a priority which is equal to or greater than a first threshold value among the plurality of priorities.

4. The base station according to claim 1, wherein the priority controller lowers a priority among the plurality of priorities when the number of times that data transmission has been performed under communication control according to the priority is equal to or greater than a second threshold value.

5. The base station according to claim 1, wherein the priority controller lowers a priority having a degree of a variation in the information is less than a third threshold value among the plurality of priorities.

6. The base station according to claim 2, wherein the priority controller raises the remaining priorities in accordance with the lowering of the highest priority.

7. A communication terminal communicable with a base station, the communication terminal comprising:
a transmitter that transmits information about the amount of remaining battery of the communication terminal, wherein
the transmitter is controlled to communicate with the base station in accordance with a priority determined based on a plurality of the information by the base station so that the plurality of priorities get higher as the amount of remaining battery of the transmitter gets lower, the priority being varied, irrespective of a variation in the information, so that the plurality of priorities are leveled off in a predetermined time period.

8. A method for communication between a plurality of communication terminals and a base station, the method comprising:

at each of the plurality of communication terminals, transmitting information about the amount of remaining battery of the communication terminals to the base station so that the base station determines a priority of each said communication terminal;

at the base station, receiving the information from each of said communication terminal;

determining a plurality of priorities so that the plurality of priorities get higher as the amount of remaining battery of the transmitter gets lower;

controlling data communication with the plurality of communication terminals in accordance with the priorities; and varying, irrespective of a variation in the plurality of the information, the plurality of priorities so that the plurality of priorities are leveled off in a predetermined time period.

* * * * *